United States Patent
Oberheide

(10) Patent No.: US 7,472,628 B2
(45) Date of Patent: Jan. 6, 2009

(54) DOOR HANDLE INPUT DECOUPLER FOR A CINCHING LATCH ACTUATOR

(75) Inventor: G. Clarke Oberheide, Troy, MI (US)

(73) Assignee: Intier Automotive Closures Inc., Newmarket, Ontario (CA)

( * ) Notice: Subject to any disclaimer, the term of this patent is extended or adjusted under 35 U.S.C. 154(b) by 134 days.

(21) Appl. No.: 11/230,010

(22) Filed: Sep. 19, 2005
(Under 37 CFR 1.47)

(65) Prior Publication Data
US 2006/0066114 A1    Mar. 30, 2006

(51) Int. Cl.
*E05F 15/00* (2006.01)
*F16H 35/00* (2006.01)
*F16D 11/14* (2006.01)

(52) U.S. Cl. ............... 74/625; 192/69.8; 192/89.21; 292/199

(58) Field of Classification Search ............ 192/69.82, 192/89.21, 96; 74/625; 292/201, 199
See application file for complete search history.

(56) References Cited

U.S. PATENT DOCUMENTS

| | | | | |
|---|---|---|---|---|
| 2,439,941 A | * | 4/1948 | Lounsbury | 192/89.21 |
| 2,762,225 A | * | 9/1956 | Robertson | 192/96 |
| 3,515,250 A | * | 6/1970 | Cantalupo | 74/625 |
| 3,791,071 A | * | 2/1974 | Niklaus | 74/625 |
| 4,085,629 A | * | 4/1978 | Fogarollo | 74/625 |
| 4,285,496 A | * | 8/1981 | Coles | 74/625 |
| 4,502,718 A | | 3/1985 | Sasaki et al. | |
| 4,573,723 A | | 3/1986 | Morita et al. | |
| 4,706,512 A | | 11/1987 | McKernon et al. | |
| 4,779,912 A | | 10/1988 | Ikeda et al. | |
| 4,796,932 A | | 1/1989 | Tame | |
| 4,885,954 A | * | 12/1989 | Wanlass | 292/201 |
| 4,966,266 A | | 10/1990 | Yamada et al. | |
| 5,088,347 A | | 2/1992 | Wanlass | |
| 5,101,684 A | * | 4/1992 | Mosslacher | 74/625 |
| 5,295,374 A | | 3/1994 | Bender et al. | |
| 5,566,593 A | * | 10/1996 | Vordermaier | 74/625 |
| 5,639,130 A | | 6/1997 | Rogers, Jr. et al. | |
| 5,694,812 A | | 12/1997 | Maue et al. | |
| 5,951,070 A | | 9/1999 | Spurr | |
| 6,073,504 A | * | 6/2000 | Gleixner et al. | 74/625 |
| 6,116,110 A | | 9/2000 | Maue et al. | |

* cited by examiner

*Primary Examiner*—Rodney H Bonck
(74) *Attorney, Agent, or Firm*—Clark Hill PLC

(57) ABSTRACT

A mechanically-activated decoupler is used in the actuator of the cinching latch mechanism. The decoupler activates with an input from door handle operation such that the motor drive within the actuator decouples from the remainder of the actuator gear train and latch mechanism whenever the door handle is operated. At rest the actuator is direct-coupled to the latch mechanism having a lost motion provision to allow manual latch function. Because of this the actuator with its motor drive is unloaded and routine door handle-activated decoupling carries little friction. In the event of a power failure during a cinching or release cycle, the handle input activates the clutch and decouples the otherwise binding motor drive of the actuator allowing the remainder of the latch mechanism to return to its at rest state using light return springs. After returning to its at rest state the latch mechanism retains normal manual function until the power failure is corrected.

14 Claims, 4 Drawing Sheets

DOOR HANDLE INPUT DECOUPLER FOR A CINCHING LATCH ACTUATOR

CROSS-REFERENCE TO RELATED APPLICATIONS

This application claims the benefit of and priority to U.S. patent application Ser. No. 10/757,960, filed on Jan. 15, 2004 and entitled "Door Handle Input Decoupler For A Cinching Latch Actuator", which claims the benefit of and priority to U.S. Provisional Application Ser. No. 60/440,292, filed Jan. 15, 2003.

BACKGROUND OF THE INVENTION

1. Field of the Invention

The invention relates to cinching latch mechanisms for liftgates of motor vehicles. More specifically, the invention relates to a mechanical clutch assembly for a motorized cinching latch mechanism for a liftgate of a motor vehicle.

2. Description of the Related Art

Cinching latches are used with closure panels, e.g., side doors, sliding doors, liftgates and, in some instances, deck lids, to secure the closure panel. The cinching latches are commonly used when the closure panel is powered from the open position to the closed position. In addition, cinching latches are used in manual operation to facilitate the closing of the closure panel without the operator thereof slamming the closure panel closed. More specifically, the operator merely moves the closure panel close to the closed position and the cinching latch completes the closure of the closure panel.

Cinching latches are also used to automatically secure and/or release the closure panel from the closed position. In this situation, the cinching latch releases the closure panel allowing the closure panel to move to a partially open position. From that position, manual power or power-assist devices, e.g., pneumatic struts or springs, or automatic opening mechanisms move the closure panel to its fully open position.

The cinching latch mechanisms require the ability of the operator to override the cinching latch mechanism to completely and manually close the closure panel. Also, the cinching latch mechanisms need to allow for operation of the closure panel during periods of loss of power. Typical cinching latch mechanisms incorporate electromagnetic clutches to facilitate the manual closing of the liftgate to its fully closed position. The electromagnetic clutch is not desired because it is costly and requires a great deal of power to operate.

SUMMARY OF THE INVENTION

A door handle decoupler is incorporated into a cinching door latch used to power cinch and release a door or liftgate. Door handle operation activates the decoupler so that the power drive of the latch separates from the remainder of the latch mechanism. Under normal power operation, the power drive moves back and forth to cause respective latch cinch and release operations. The latch mechanism also has its regular manual function with the power drive parked in a proper position. In this state the power drive is unloaded and normal door handle-activated decoupling carries little load or friction. In the event of an electrical or mechanical failure during the power operation, the door handle activates the decoupler to remove the binding force of a non-backdrivable power drive, enabling the latch mechanism to reset to its proper position using light return springs. After reset, the latch mechanism retains normal manual function until the power operation failure can be corrected.

BRIEF DESCRIPTION OF THE DRAWINGS

Advantages of the invention will be readily appreciated, as the same becomes better understood by reference to the following detailed description when considered in connection with the accompanying drawings, wherein.

DETAILED DESCRIPTION OF THE PREFERRED EMBODIMENT

Figure 1:
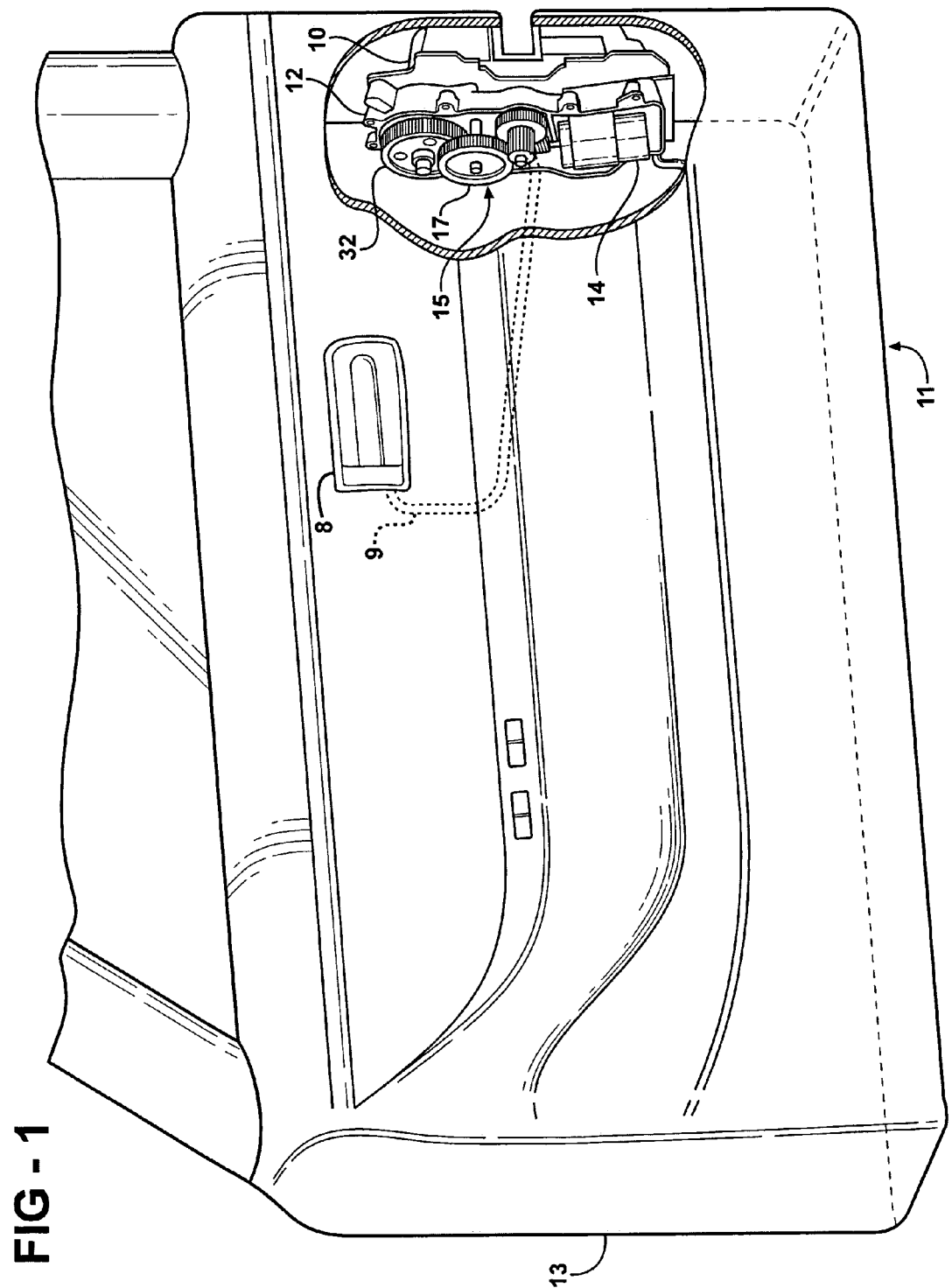
FIG. 1 is a perspective view of one embodiment of the invention secured to a cinching latch of a motor vehicle, partially cut away.

Referring to FIG. 1, a cinching latch 10 is fixedly secured to a motor vehicle generally shown at 11. The cinching latch 10 cinches a striker (not shown) secured to a door jamb or pillar (not shown) used to close and secure a closure panel 13. The cinching latch 10 has a power drive mode and a manual mode. It should be appreciated by those skilled in the art that the cinching latch 10 can be used for any automotive closure panel, including, but not limited to, side pivoting doors 13, sliding side doors, liftgates, deck lids and the like.

Figure 2:
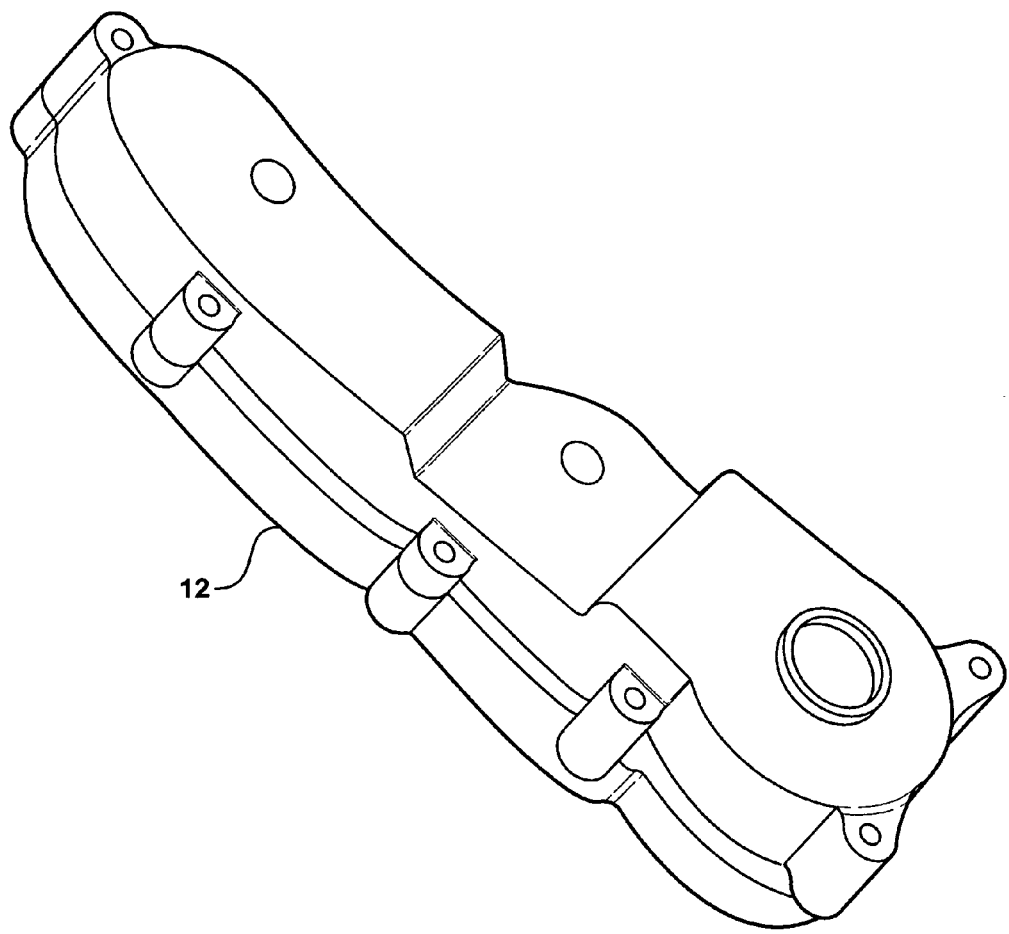
FIG. 2 is a perspective view of a housing for a cinching latch actuator.

Secured to the cinching latch 10 is an actuator housing 12. The actuator housing 12 is fixedly secured to the cinching latch 10 of the closure panel 13. The cinching latch 10 includes a motor 14 that actuates the cinching latch 10. The actuator housing 12 is shown in FIG. 2. In FIG. 1, the lid of the actuator housing 12 is removed to show the transmission 15. The transmission 15 includes a gear train 17 that eventually engages a driven gear 32, discussed in greater detail subsequently.

Figure 3:
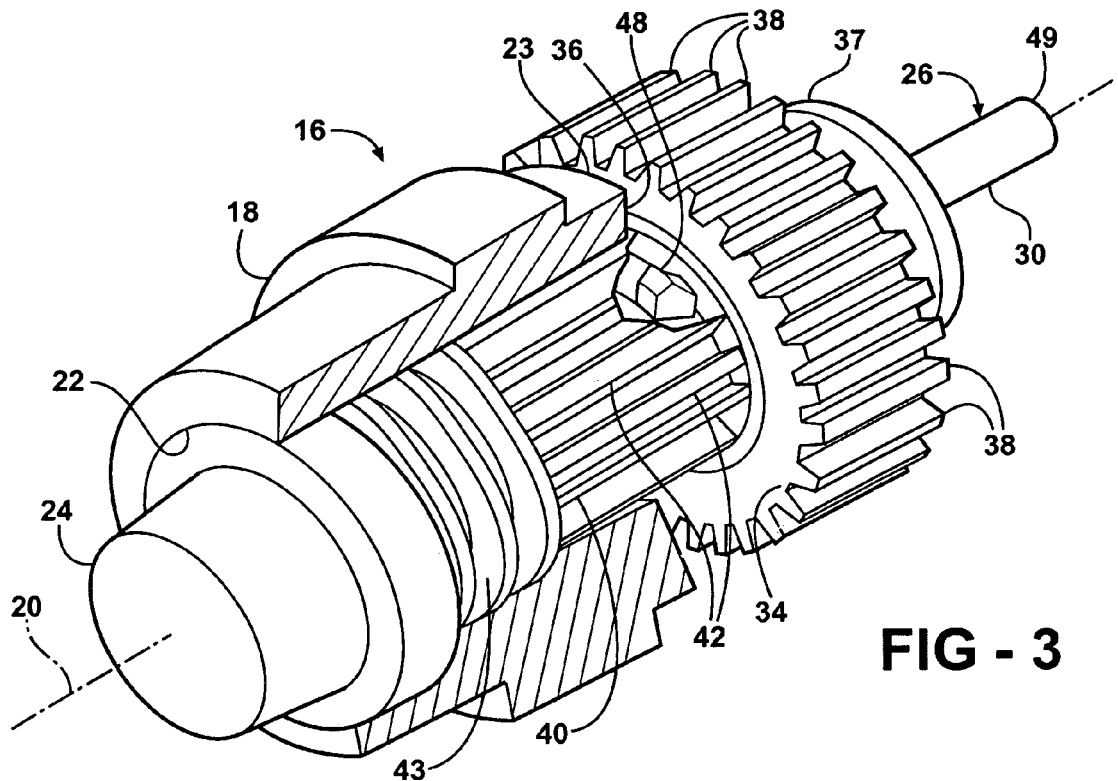
FIG. 3 is a perspective view of the invention with a pinion gear engaged with a driven gear.

Disposed inside the actuator housing 12 is a decoupler or decoupler assembly, generally indicated at 16 in FIG. 3. The mechanical decoupler assembly 16 includes a clutch housing 18. The decoupler housing 18 defines a longitudinal axis 20 extending therethrough. The decoupler housing 18 also defines an axial opening 22 and a peripheral opening 23 opposite a closed end 24. In FIG. 3, the axial opening 22 is cut away further to show more detail inside the housing 18.

Figure 4:
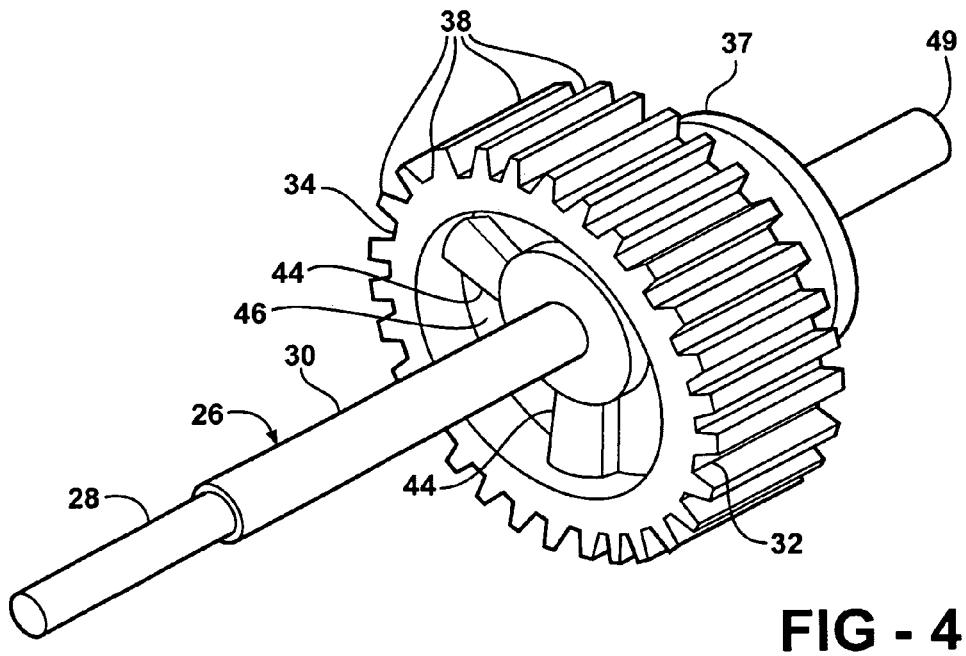
FIG. 4 is a perspective view of the shaft and driven gear of the mechanical clutch assembly according to one embodiment of the invention.

A shaft, generally shown at 26, extends through the housing 18 and out the peripheral opening 23. The shaft 26 extends along the longitudinal axis 20. Referring to FIG. 4, the shaft 26 includes a first shaft member 28 telescoping within a second shaft member 30. A spring (not shown) internal to the shaft 26 biases the first shaft member 28 out and away from the second shaft member 30. Therefore, the shaft 26 may be compressed by forcing the second shaft member 30 over the first shaft member 28.

The decoupler assembly 16 also includes the driven gear 32 that is rotatable about the shaft 26 while being axially positioned by the housing 18. More specifically, the driven gear 32 is free to rotate about the shaft 26, but does not move axially therealong because a side surface 34 of the driven gear 32 abuts a ledge 36 of the housing 18 preventing it from moving should the shaft 26 be compressed. In addition, a collar 37, fixedly secured to the shaft 26, prevents the driven gear 32 from moving axially away from the actuator housing 12.

The driven gear 32 includes a plurality of teeth 38 extending around the periphery of the driven gear 32. The plurality of teeth 38 operatively engage the motor 14 via the transmission 15. The driven gear 32 receives the rotational force from the motor 14 and rotates about the shaft 26.

The decoupler assembly 16 also includes a pinion gear 40 having a plurality of teeth 42 extending thereabout. The pinion gear 40 rotates with respect to the shaft 26. In contrast to the driven gear 32, the pinion gear 40 does move with the shaft 26 as it is compressed and allowed to expand. More specifically, the pinion gear 40 moves axially within the housing 18 upon compression of the shaft 26. The axial movement of the pinion gear 40 allows it to selectively engage the driven gear 32. When the shaft 26 is compressed, the pinion gear 40 disengages from the driven gear 32. A pinion spring 43 biases the pinion gear 40 into engagement with the driven gear 32.

The pinion gear 40 is operatively connected to the cinching latch 10. Therefore, when the pinion gear 40 is disengaged from the driven gear 32, the cinching latch 10 may be manually operated without affecting the rotational position of the motor 14. More specifically, manual operation of the cinching latch 10 causes the pinion gear 40 to rotate, but because the pinion gear 40 is disengaged from the driven gear 32 the pinion gear 40 does not cause rotation of the driven gear 32. Therefore, the cinching latch 10 may be manually operated without having to overcome the forces generated by the motor 14 if it is not moving. This will allow the movement of the closure panel 13 without requiring overcoming the forces of the motor 14 when it is in its park position.

The decoupler assembly 16 extends between the driven gear 32 and the pinion gear 40. The decoupler assembly 16 allows the pinion gear 40 to disengage from the driven gear 32 when the handle 8 is operated manually. As may be seen in FIG. 3, the decoupler assembly 16 includes a first set of teeth 44 that extends from a center portion 46 of the driven gear 32. The first set of teeth 44 engages a similarly designed second set of teeth 48 that extends radially out from a center portion of the pinion gear 40 to engage the pinion 40 and driven 32 gears.

In operation, when the door handle 8 is manually operated, linkage 9 moves a release end 49 of the shaft 26 axially inwardly toward the housing 18. When the release end 49 receives a force to move axially inwardly, the pinion gear 40 moves with the shaft 26 as it telescopingly collapses upon itself. Because the driven gear 32 cannot move axially due to the ledge 36 in the housing 18, the first set of teeth 44 of the driven gear 32 is separated from the second set of teeth 48 of the pinion gear 40. Thus, the pinion gear 40 is disengaged from the driven gear 32, which effectively disengages the motor 14 from the cinching latch 10. This allows the cinching latch 10 to reset to its at rest position using light return springs.

Figure 5:
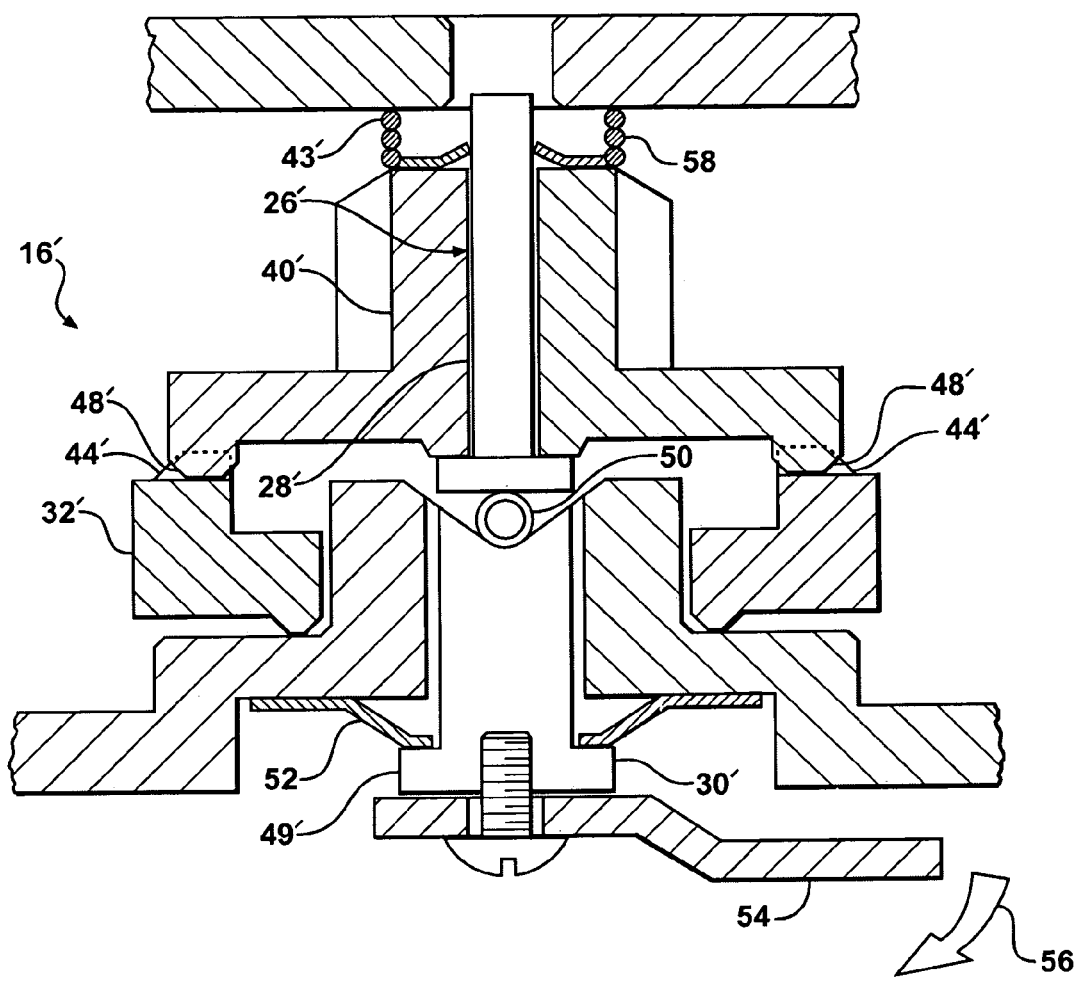
FIG. 5 is a cross-sectional side view of an alternative embodiment of the invention.

Referring to FIG. 5, wherein like prime numerals represent similar elements of a different embodiment, the mechanical clutch assembly 16' is shown in cross section. As may be seen, the clutch teeth 44' of the driven gear 32' engage clutch teeth 48' of the pinion gear 40. In this embodiment, the shaft 26' is not telescoping. The shaft 26' includes a first shaft member 28' and a second shaft member 30' that abut each other through a resilient member 50. A positioning spring 52 forces the second shaft member 30' away from the pinion gear 40'. In addition, the positioning spring 52 maintains the second shaft member 30' coaxial with the rest of the clutch assembly 16'.

A lever 54 can be rotated in the direction of an arrow 56 to force the second shaft member 30' into the first shaft member 28'. This will force the pinion gear 40' away from the driven gear 32' which, in turn, separates the clutch teeth 48 of the pinion gear 40' from the clutch teeth 44' of the driven gear 32'.

The second embodiment also includes a flexible collar 58 that maintains the pinion gear 40' aligned with the first shaft member 28'. The flexible collar 58 is surrounded by a pinion spring 43', which operates in the same fashion as the pinion spring 43 of the first embodiment.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A decoupling assembly for a vehicle door, said decoupling assembly comprising:

at least one handle operatively coupled to the door;

a cinching latch mounted to the door and having a manual mode and a power drive mode to cinch and release the door;

a decoupler operatively coupled to said cinching latch to interrupt said power drive mode within said cinching latch, said decoupler including a housing defining a longitudinal axis and having an axial opening, a shaft extending through said housing and out said axial opening along said longitudinal axis, said shaft including a first shaft member, a second shaft member and a resilient member extending therebetween, a driven gear rotatably secured to said shaft and axially positioned by said housing, a pinion gear rotatably secured to said shaft and selectively engageable with said driven gear, a positioning spring extending between said housing and said second shaft member forcing said second shaft member away from said pinion gear and aligning said second shaft member coaxially with said first shaft member, a pinion spring extending between said housing and said pinion gear to bias said pinion gear toward said driven gear to engage said pinion gear with said driven gear; and a linkage operatively connecting said at least one handle to said decoupler wherein operation of said at least one handle actuates said decoupler to decouple said power drive mode from said cinching latch for enabling said cinching latch to reset to said manual mode when said power drive mode is interrupted by mechanical or electrical failure.

2. A decoupling assembly as set forth in claim 1 wherein said cinching latch includes a motor that actuates said cinching latch in said power drive mode.

3. A decoupling assembly as set forth in claim 2 wherein said decoupler decouples said motor from said cinching latch in response to operation of said at least one handle.

4. An assembly as set forth in claim 3 wherein said driven gear has a first set of teeth fixedly secured thereto.

5. An assembly as set forth in claim 4 wherein said driven gear is operatively connected to said motor and driven thereby.

6. An assembly as set forth in claim 4 wherein said pinion gear includes a second set of teeth fixedly secured thereto and selectively engageable with said first set of teeth of said driven gear when said pinion gear is engaged with said driven gear allowing said motor to operate said cinching latch.

7. An assembly as set forth in claim 6 wherein said first shaft member telescopes within said second shaft member.

8. An assembly as set forth in claim 7 wherein said second shaft member includes a release end for receiving a releasing force from said linkage to overcome said pinion spring to disengage said pinion gear from said driven gear.

9. An assembly as set forth in claim 8 wherein said decoupler includes a collar fixedly secured to said second shaft member such that said collar extends out from said second shaft perpendicularly therefrom to prevent said driven gear from moving axially away from said housing.

10. A decoupler assembly for selectively disengaging a motor from a cinching latch of a closure panel having a handle, said decoupler assembly comprising:
- a housing defining a longitudinal axis and including an axial opening;
- a shaft extending through said housing and out said axial opening along said longitudinal axis, said shaft including a first shaft member, a second shaft member and a resilient member extending therebetween;
- a driven gear rotatably secured to said shaft and axially positioned by said housing, said driven gear operatively connected to the motor and driven thereby;
- a pinion gear rotatably secured to said shaft and selectively engageable with said driven gear;
- a positioning spring extending between said housing and said second shaft member forcing said second shaft member away from said pinion gear and aligning said second shaft member coaxially with said first shaft member;
- a pinion spring extending between said housing and said pinion gear to bias said pinion gear toward said driven gear to engage said pinion gear with said driven gear; and
- a lever fixedly secured to said second shaft member to force said first and second shaft members axially with respect to said driven gear to disengage said pinion gear from said driven gear for enabling the cinching latch to reset to a manual mode when the motor is interrupted by mechanical or electrical failure.

11. A decoupler assembly as set forth in claim 10 wherein said driven gear includes a first set of teeth fixedly secured thereto.

12. A decoupler assembly as set forth in claim 11 wherein said pinion gear includes a second set of teeth fixedly secured thereto and selectively engageable with said first set teeth of said driven gear when said pinion gear is engaged with said driven gear allowing the motor to operate the cinching latch.

13. A decoupler assembly as set forth in claim 12 including a flexible collar securing said pinion gear along said first shaft member.

14. A decoupler assembly as set in claim 13 including a fastener fixedly securing said lever to said second shaft member.

* * * * *